US012530689B2

(12) United States Patent
Dervovic et al.

(10) Patent No.: US 12,530,689 B2
(45) Date of Patent: Jan. 20, 2026

(54) METHOD AND SYSTEM FOR PERFORMING NON-PARAMETRIC STOCHASTIC SEQUENTIAL ASSIGNMENT OF JOBS WITH RANDOM ARRIVAL TIMES

(71) Applicant: JPMorgan Chase Bank, N.A., New York, NY (US)

(72) Inventors: Danial Dervovic, London (GB); Parisa Hassanzadeh, San Jose, CA (US); Prashant P Reddy, Madison, NJ (US); Manuela Veloso, New York, NY (US); Samuel Ayalew Assefa, Hoboken, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 940 days.

(21) Appl. No.: 17/660,728

(22) Filed: Apr. 26, 2022

(65) Prior Publication Data
US 2022/0365519 A1    Nov. 17, 2022

Related U.S. Application Data

(60) Provisional application No. 63/179,841, filed on Apr. 26, 2021.

(51) Int. Cl.
*G06Q 20/40* (2012.01)
*G05B 19/418* (2006.01)
(Continued)

(52) U.S. Cl.
CPC ............ *G06Q 20/4015* (2020.05); *G05B 19/41865* (2013.01); *G06F 18/2193* (2023.01);
(Continued)

(58) Field of Classification Search
CPC ............ G06N 20/00; G06Q 20/4015; G06F 18/2193; G06F 18/241; G05B 19/41865; G05B 2219/23288
See application file for complete search history.

(56) References Cited

U.S. PATENT DOCUMENTS

2022/0114593 A1\*   4/2022   Johnson ............ G06F 18/24133

OTHER PUBLICATIONS

Oscar Hernan Madrid Padilla, Alex Athey, Alex Reinhart, and James G Scott. Sequential nonparametric tests for a change in distribution: an application to detecting radiological anomalies. Journal of the American Statistical Association, pp. 1-15, 2018 (Year: 2018).\*

\* cited by examiner

*Primary Examiner* — Jacob D Dascomb
(74) *Attorney, Agent, or Firm* — GREENBLUM & BERNSTEIN, P.L.C.

(57) ABSTRACT

A method and a system for performing stochastic sequential assignment of jobs with random arrival times is provided. The method includes receiving a first plurality of jobs in a sequence; and sequentially applying, to each respective job from among the first plurality of jobs, a non-parametric sequential allocation algorithm in order to determine whether to accept the respective job or to decline the respective job. The application of the non-parametric sequential allocation algorithm includes calculating, for each respective job, a corresponding reward value that relates to a reward that is gained when the respective job is accepted; and maximizing an expected cumulative reward value based on the calculated reward values.

17 Claims, 4 Drawing Sheets

(51) Int. Cl.
 G06F 18/21 (2023.01)
 G06F 18/241 (2023.01)
 G06N 20/00 (2019.01)
(52) U.S. Cl.
 CPC ........... G06F 18/241 (2023.01); G06N 20/00 (2019.01); G05B 2219/23288 (2013.01)

METHOD AND SYSTEM FOR PERFORMING NON-PARAMETRIC STOCHASTIC SEQUENTIAL ASSIGNMENT OF JOBS WITH RANDOM ARRIVAL TIMES

CROSS-REFERENCE TO RELATED APPLICATIONS

This application claims priority from U.S. Provisional Patent Application No. 63/179,841, filed in the U.S. Patent and Trademark Office on Apr. 26, 2021, which is hereby incorporated by reference in its entirety.

BACKGROUND

1. Field of the Disclosure

This technology generally relates to methods and systems for assigning jobs, and more particularly to methods and systems for automating a performance of non-parametric stochastic sequential assignment of jobs with random arrival times by applying an efficient job allocation algorithm.

2. Background Information

In industrial settings, it is often the case that a positive class assignment by a classifier results in an expensive manual intervention. A problem frequently arises whereby the number of these alerts exceeds the capacity of operators to manually investigate alerted examples. A common scenario is one where each example is further endowed with an intrinsic value along with its class label, with all negative examples having zero value to the operator. Given their limited capacity, operators wish to maximize the cumulative value gained from expensive manual interventions. As an example, in financial fraud detection, this may be manifested as truly fraudulent transactions having value to the operator as some function of the monetary value of the transaction, and non-fraudulent transactions yielding zero value.

In the present disclosure, one objective is to systematically account for the constraint on intervention capacity and desire to maximize reward, in the setting where selections are made in real-time and there is access to a large backlog of training data. This problem structure is not limited to fraud. For example, in cybersecurity, automated content moderation, compliance verification, and automated inspection in manufacturing, there is a need for filtering a stream of comparable examples that are too numerous for exhaustive manual inspection, with the imperative of maximizing the value of inspected examples. This may be examined by taking an abstract view of jobs arriving, each having an intrinsic value.

To this end, an approach is taken with respect to a problem in which jobs arrive according to a random process and take on random nonnegative values. At each job arrival, the decision-maker must decide immediately whether or not to accept the job and gain the value on offer as a reward. The decision-maker may only accept at most N jobs over some reference time period. Conventionally, this problem has been solved optimally by way of a system of ordinary differential equations (ODE). Importantly, the job arrival process is assumed to be known and admits a closed-form mathematical expression. However, solving the resulting system of ODEs analytically quickly becomes impractical, even for trivial job arrival processes.

Accordingly, there is a need for a mechanism that would allow one merely to observe M realizations of the job arrival process and still recover the optimal solution, as defined by this solution of ODEs, with high probability.

SUMMARY

The present disclosure, through one or more of its various aspects, embodiments, and/or specific features or sub-components, provides, inter alia, various systems, servers, devices, methods, media, programs, and platforms for hosting a market data distribution platform that is widely used by many financial organizations in a public cloud computing environment.

According to an aspect of the present disclosure, a method for performing stochastic sequential assignment of jobs with random arrival times is provided. The method is implemented by at least one processor. The method includes: receiving, by the at least one processor, a first plurality of jobs in a sequence; and sequentially applying, by the at least one processor, a non-parametric sequential allocation algorithm to each respective job from among the first plurality of jobs in order to determine whether to accept the respective job or to decline the respective job.

For each respective job from among the first plurality of jobs, a determination whether to accept the respective job or to decline the respective job may be made before an arrival of a next job from among the first plurality of jobs.

The sequential application of the non-parametric sequential allocation algorithm may include: generating a predetermined number of time-varying threshold curves, the predetermined number being equal to a maximum number of jobs to be accepted within a predetermined time interval; calculating, for each respective job, a corresponding reward value that relates to a reward that is gained when the respective job is accepted; comparing, for each respective job from among a first subset of the first plurality of jobs, the corresponding reward value with a first threshold curve; determining whether to accept the respective job based on whether the corresponding reward value exceeds the first threshold curve; when the respective job is accepted, comparing, for each respective job from among a next subset of the first plurality of jobs, the corresponding reward value with a next threshold curve, and repeating the determining and the comparing until the predetermined number of jobs have been accepted; and when the predetermined number of jobs have been accepted, ending the applying of the non-parametric sequential allocation algorithm.

The non-parametric sequential allocation algorithm may be designed to maximize an expected cumulative reward value that relates to the calculated reward values.

The receiving of the plurality of jobs in the sequence may include receiving the plurality of jobs based on a sequential arrival that corresponds to a nonhomogeneous Poisson process with an unknown continuous intensity function. The unknown continuous intensity function may be estimated based on a first set of historical job data that includes, for each respective job from among a second plurality of jobs that have previously been received, a corresponding arrival time and a corresponding reward value.

The generating of the predetermined number of time-varying threshold curves may include using an unknown cumulative distribution of independent identically distributed nonnegative random variables that has an unknown finite mean value and an unknown density function to generate each respective threshold curve. Each of the unknown cumulative distribution, the unknown finite mean value, and the unknown density function may be estimated based on the first set of historical job data.

The generating of the predetermined number of time-varying threshold curves may further include estimating a mean shortage function that relates to the corresponding reward to be calculated for each respective job.

The estimating of the mean shortage function may include applying an empirical complementary cumulative distribution fit function to corresponding reward values that relate to the first set of historical job data.

According to another aspect of the present disclosure, a computing apparatus for performing stochastic sequential assignment of jobs with random arrival times is provided. The computing apparatus includes a processor; a memory; and a communication interface coupled to each of the processor and the memory. The processor is configured to: receive, via the communication interface, a first plurality of jobs in a sequence; and sequentially apply, to each respective job from among the first plurality of jobs, a non-parametric sequential allocation algorithm in order to determine whether to accept the respective job or to decline the respective job.

For each respective job from among the first plurality of jobs, the processor may be further configured to determine whether to accept the respective job or to decline the respective job before an arrival of a next job from among the first plurality of jobs.

The processor may be further configured to: generate a predetermined number of time-varying threshold curves, the predetermined number being equal to a maximum number of jobs to be accepted within a predetermined time interval; calculate, for each respective job, a corresponding reward value that relates to a reward that is gained when the respective job is accepted; compare, for each respective job from among a first subset of the first plurality of jobs, the corresponding reward value with a first threshold curve; determine whether to accept the respective job based on whether the corresponding reward value exceeds the first threshold curve; when the respective job is accepted, compare, for each respective job from among a next subset of the first plurality of jobs, the corresponding reward value with a next threshold curve, and repeat the determining and the comparing until the predetermined number of jobs have been accepted; and when the predetermined number of jobs have been accepted, end the applying of the non-parametric sequential allocation algorithm.

The non-parametric sequential allocation algorithm may be designed to maximize an expected cumulative reward value that relates to the calculated reward values.

The processor may be further configured to receive the plurality of jobs in the sequence based on a sequential arrival that corresponds to a nonhomogeneous Poisson process with an unknown continuous intensity function. The unknown continuous intensity function may be estimated based on a first set of historical job data that includes, for each respective job from among a second plurality of jobs that have previously been received, a corresponding arrival time and a corresponding reward value.

The processor may be further configured to generate the predetermined number of time-varying threshold curves by using an unknown cumulative distribution of independent identically distributed nonnegative random variables that has an unknown finite mean value and an unknown density function to generate each respective threshold curve. Each of the unknown cumulative distribution, the unknown finite mean value, and the unknown density function may be estimated based on the first set of historical job data.

The processor may be further configured to generate the predetermined number of time-varying threshold curves by estimating a mean shortage function that relates to the corresponding reward to be calculated for each respective job.

The processor may be further configured to estimate the mean shortage function by applying an empirical complementary cumulative distribution fit function to corresponding reward values that relate to the first set of historical job data.

According to yet another aspect of the present disclosure, a non-transitory computer readable storage medium storing instructions for performing stochastic sequential assignment of jobs with random arrival times is provided. The storage medium includes executable code which, when executed by a processor, causes the processor to: receive a first plurality of jobs in a sequence; and sequentially apply, to each respective job from among the first plurality of jobs, a non-parametric sequential allocation algorithm in order to determine whether to accept the respective job or to decline the respective job.

For each respective job from among the first plurality of jobs, a determination whether to accept the respective job or to decline the respective job may be made before an arrival of a next job from among the first plurality of jobs.

The executable code may further cause the processor to: generate a predetermined number of time-varying threshold curves, the predetermined number being equal to a maximum number of jobs to be accepted within a predetermined time interval; calculate, for each respective job, a corresponding reward value that relates to a reward that is gained when the respective job is accepted; compare, for each respective job from among a first subset of the first plurality of jobs, the corresponding reward value with a first threshold curve; determine whether to accept the respective job based on whether the corresponding reward value exceeds the first threshold curve; when the respective job is accepted, compare, for each respective job from among a next subset of the first plurality of jobs, the corresponding reward value with a next threshold curve, and repeat the determining and the comparing until the predetermined number of jobs have been accepted; and when the predetermined number of jobs have been accepted, end the applying of the non-parametric sequential allocation algorithm.

The non-parametric sequential allocation algorithm may be designed to maximize an expected cumulative reward value that relates to the calculated reward values.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
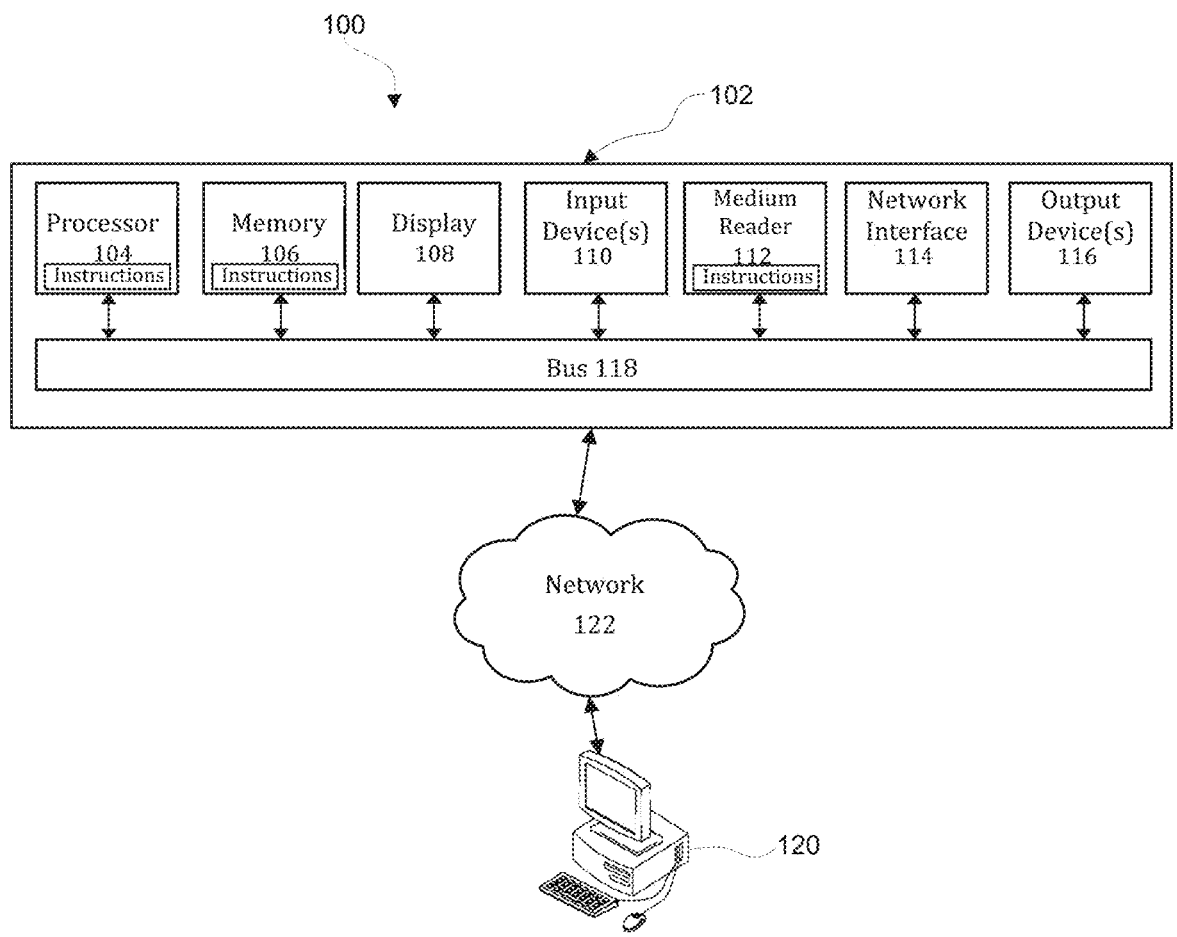
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automating a performance of non-parametric stochastic sequential assignment of jobs with random arrival times by applying an efficient job allocation algorithm.

Figure 2:
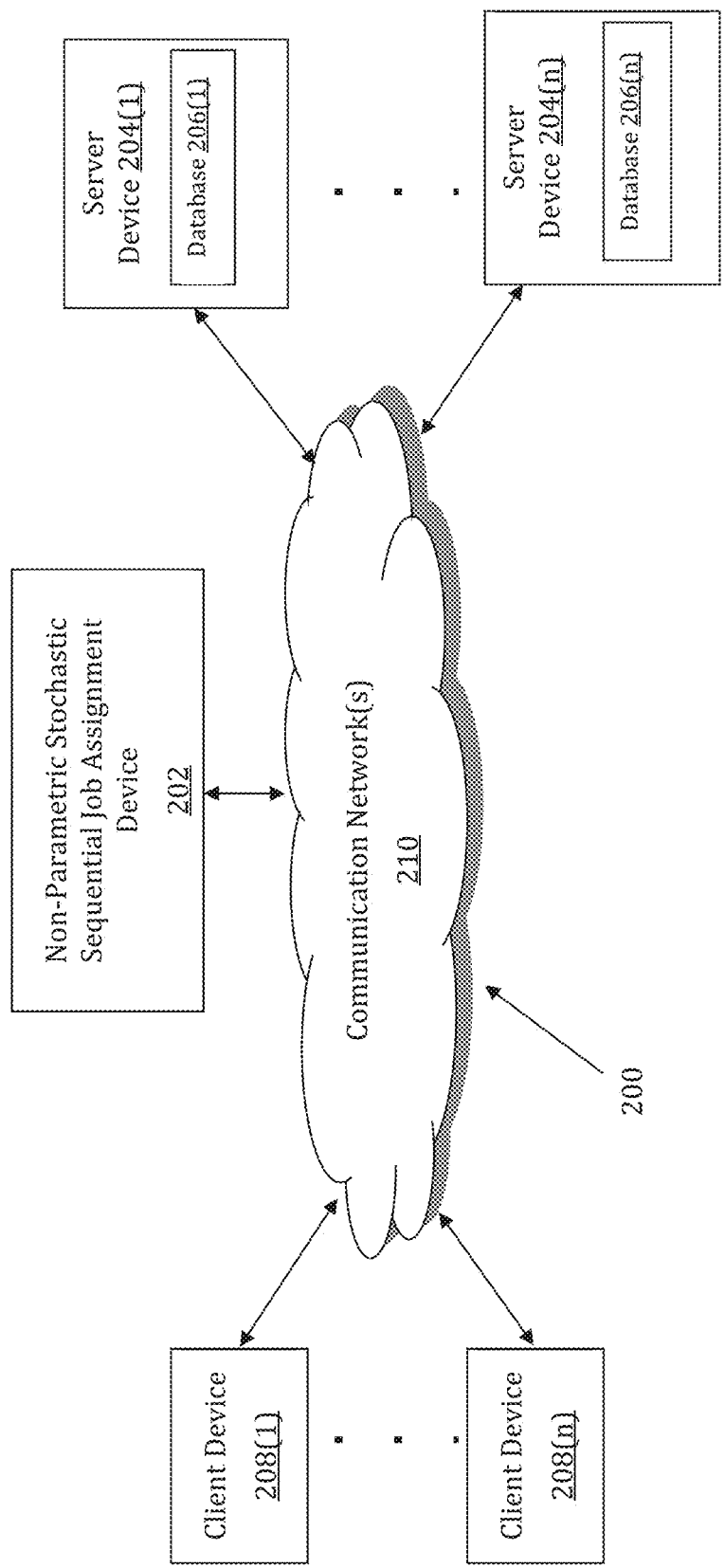
FIG. 2 illustrates an exemplary diagram of a network environment.

Referring to FIG. 2, a schematic of an exemplary network environment 200 for implementing a method for automating a performance of non-parametric stochastic sequential assignment of jobs with random arrival times by applying an efficient job allocation algorithm is illustrated. In an exemplary embodiment, the method is executable on any networked computer platform, such as, for example, a personal computer (PC).

The method for automating a performance of non-parametric stochastic sequential assignment of jobs with random arrival times by applying an efficient job allocation algorithm may be implemented by a Non-Parametric Stochastic Sequential Job Assignment (NPSSJA) device 202. The NPSSJA device 202 may be the same or similar to the computer system 102 as described with respect to FIG. 1. The NPSSJA device 202 may store one or more applications that can include executable instructions that, when executed by the NPSSJA device 202, cause the NPSSJA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the NPSSJA device 202 itself, may be located in virtual server(s) running in a cloud-based computing environment rather than being tied to one or more specific physical network computing devices. Also, the application(s) may be running in one or more virtual machines (VMs) executing on the NPSSJA device 202. Additionally, in one or more embodiments of this technology, virtual machine(s) running on the NPSSJA device 202 may be managed or supervised by a hypervisor.

In the network environment 200 of FIG. 2, the NPSSJA device 202 is coupled to a plurality of server devices 204(1)-204(n) that hosts a plurality of databases 206(1)-206(n), and also to a plurality of client devices 208(1)-208(n) via communication network(s) 210. A communication interface of the NPSSJA device 202, such as the network interface 114 of the computer system 102 of FIG. 1, operatively couples and communicates between the NPSSJA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the NPSSJA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and NPSSJA devices that efficiently implement a method for automating a performance of non-parametric stochastic sequential assignment of jobs with random arrival times by applying an efficient job allocation algorithm.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The NPSSJA device 202 may be a standalone device or integrated with one or more other devices or apparatuses, such as one or more of the server devices 204(1)-204(n), for example. In one particular example, the NPSSJA device 202 may include or be hosted by one of the server devices 204(1)-204(n), and other arrangements are also possible. Moreover, one or more of the devices of the NPSSJA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the NPSSJA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to historical job allocations and assignments and personnel-specific data that relates to status and availability for accepting a job.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the NPSSJA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the NPSSJA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the NPSSJA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the NPSSJA device 202, the server devices 204(1)-204(n), or the client devices 208(1)-208(n), for example, may be configured to operate as virtual instances on the same physical machine. In other words, one or more of the NPSSJA device 202, the server devices 204(1)-204(n), or the client devices 208(1)-208(n) may operate on the same physical device rather than as separate devices communicating through communication network(s) 210. Additionally, there may be more or fewer NPSSJA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
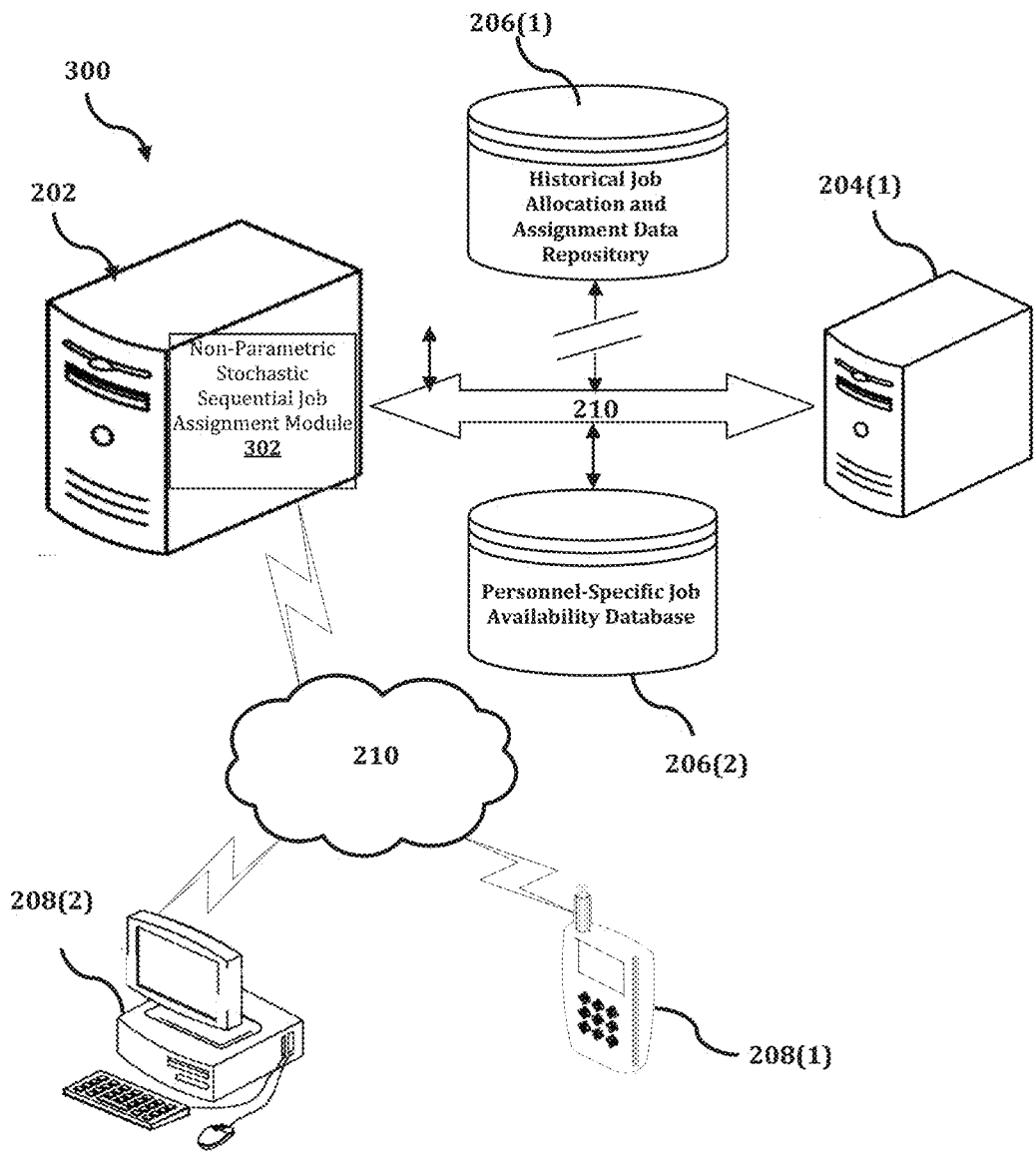
FIG. 3 shows an exemplary system for implementing a method for automating a performance of non-parametric stochastic sequential assignment of jobs with random arrival times by applying an efficient job allocation algorithm.

The NPSSJA device 202 is described and illustrated in FIG. 3 as including a non-parametric stochastic sequential job assignment module 302, although it may include other rules, policies, modules, databases, or applications, for example. As will be described below, the non-parametric stochastic sequential job assignment module 302 is configured to implement a method for automating a performance of non-parametric stochastic sequential assignment of jobs with random arrival times by applying an efficient job allocation algorithm.

An exemplary process 300 for implementing a mechanism for automating a performance of non-parametric stochastic sequential assignment of jobs with random arrival times by applying an efficient job allocation algorithm by utilizing the network environment of FIG. 2 is illustrated as being executed in FIG. 3. Specifically, a first client device 208(1) and a second client device 208(2) are illustrated as being in communication with NPSSJA device 202. In this regard, the first client device 208(1) and the second client device 208(2) may be "clients" of the NPSSJA device 202 and are described herein as such. Nevertheless, it is to be known and understood that the first client device 208(1) and/or the second client device 208(2) need not necessarily be "clients" of the NPSSJA device 202, or any entity described in association therewith herein. Any additional or alternative relationship may exist between either or both of the first client device 208(1) and the second client device 208(2) and the NPSSJA device 202, or no relationship may exist.

Further, NPSSJA device 202 is illustrated as being able to access a historical job allocation and assignment data repository 206(1) and a personnel-specific job availability database 206(2). The non-parametric stochastic sequential job assignment module 302 may be configured to access these databases for implementing a method for automating a performance of non-parametric stochastic sequential assignment of jobs with random arrival times by applying an efficient job allocation algorithm.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the NPSSJA device 202 via broadband or cellular communication. Of course, these embodiments are merely exemplary and are not limiting or exhaustive.

Upon being started, the non-parametric stochastic sequential job assignment module 302 executes a process for automating a performance of non-parametric stochastic sequential assignment of jobs with random arrival times by applying an efficient job allocation algorithm. An exemplary process for automating a performance of non-parametric stochastic sequential assignment of jobs with random arrival times by applying an efficient job allocation algorithm is generally indicated at flowchart 400 in FIG. 4.

Figure 4:
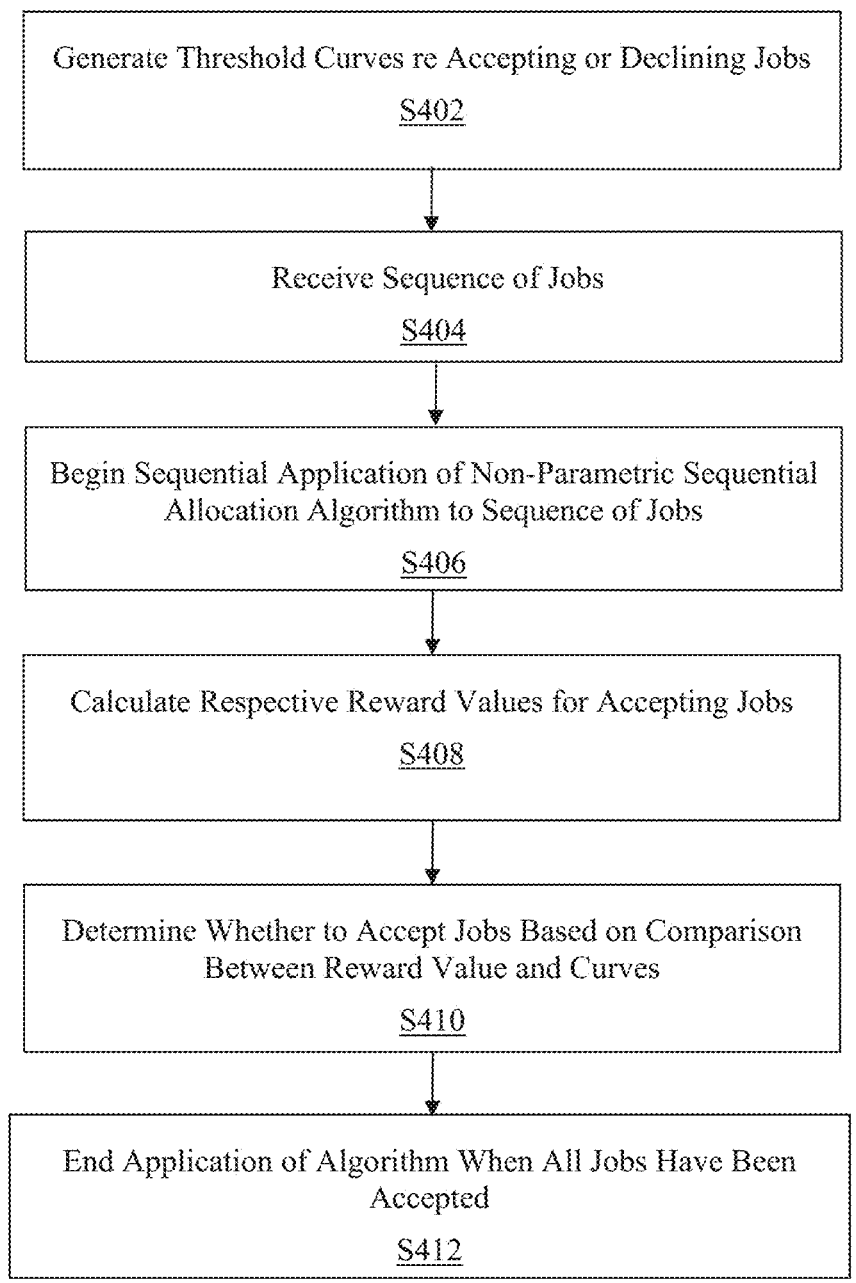
FIG. 4 is a flowchart of an exemplary process for implementing a method for automating a performance of non-parametric stochastic sequential assignment of jobs with random arrival times by applying an efficient job allocation algorithm.

In process 400 of FIG. 4, at step S402, the non-parametric stochastic sequential job assignment module 302 generates a predetermined number of time-varying threshold curves to be used for determining whether to accept or decline each respective job of an incoming sequence of job requests. In an exemplary embodiment, the predetermined number of curves is equal to a maximum number of jobs to be accepted within a particular time interval.

In an exemplary embodiment, the generating of the predetermined number of time-varying threshold curves may include using an unknown cumulative distribution of independent identically distributed nonnegative random variables that has an unknown finite mean value and an unknown density function to generate each respective threshold curve. Each of the unknown cumulative distribution, the unknown finite mean value, and the unknown density function may be estimated based on the first set of historical job data.

The generating of the predetermined number of time-varying threshold curves may further include estimating a mean shortage function that relates to the corresponding reward to be calculated for each respective job. The estimating of the mean shortage function may include applying an empirical complementary cumulative distribution fit function to corresponding reward values that relate to the first set of historical job data.

At step S404, the non-parametric stochastic sequential job assignment module 302 receives requests to perform jobs in a sequence. The jobs may be received based on a sequential arrival that corresponds to a nonhomogeneous Poisson process with an unknown continuous intensity function. The unknown continuous intensity function may be estimated based on a first set of historical job data that includes, for each respective job from among a set of jobs that have previously been received, a corresponding arrival time and a corresponding reward value.

At step S406, the non-parametric stochastic sequential job assignment module 302 begins a sequential application of a non-parametric sequential allocation algorithm to each respective job received in step S402 in order to determine whether to accept or decline the respective job.

At step S408, the non-parametric stochastic sequential job assignment module 302 calculates respective reward values that correspond to a reward that is gained when a respective job is accepted. Then, at step S410, the non-parametric stochastic sequential job assignment module 302 compares each respective reward value to a corresponding one of the threshold curves and determines whether to accept or decline each respective job based on a result of the comparison. In an exemplary embodiment, steps S408 and S410 may be repeated until all jobs have been assigned, based on the maximum number of jobs to be accepted within a particular time interval. In an exemplary embodiment, the non-parametric sequential allocation algorithm is designed to maximize an expected cumulative reward value with respect to the reward values calculated in step S408.

At step S412, the non-parametric stochastic sequential job assignment module 302 ends the application of the non-parametric sequential allocation algorithm when all of the jobs have been assigned.

In an exemplary embodiment, a method for automating a performance of non-parametric stochastic sequential assignment of jobs with random arrival times by applying an efficient job allocation algorithm is derived based on the following. A finite time horizon is assumed, from t=0 to t=T, over which jobs arrive according to a nonhomogeneous Poisson process with continuous intensity function $\lambda(t)$. There are a fixed number of indistinguishable workers, n, to be assigned to the stream of incoming jobs. Each worker may only accept one job. Every job has a nonnegative value associated to it that is gained as a reward by the decision-maker if accepted. Any job that is not assigned immediately when it arrives can no longer be assigned. It is assumed the total expected number of jobs that arrive over the horizon [0,T] is much larger than the number of available workers, that is, $n << \int_0^T \lambda(t)dt$.

The job values are understood as being independent identically distributed nonnegative random variables drawn from a cumulative distribution F with finite mean $0<\mu<\infty$ and density $f$. Moreover, it is assumed that the job value distribution is independent of the arrival process. The goal of the decision-maker is to maximize the total expected reward accorded to the n workers over the time horizon [0,T].

Conventionally, in this model, it is assumed that $\lambda(t)$ and F are known to the decision-maker ahead of time, and an optimal critical curve $y_k(t)$ is derived for each of the n workers. When the $k^{th}$ worker is active, if a job arrives at time t with value greater than $y_k(t)$, then the job is accepted, at which point the $(k-1)^{th}$ worker is then active, until all n workers have been exhausted. These critical curves are addressed in more detail below with reference to Theorem 1.

In an exemplary embodiment, the conventional sequential allocation model is modified as follows: The arrival intensity $\lambda(t)$ and F are unknown to the decision-maker ahead of time. Instead, they have access to M independent realizations of the job arrival process. The goal for the decision-maker is the same as before, that is, to derive critical curves for the n workers so as to maximize the expected cumulative reward at test time. In an exemplary embodiment, an efficient algorithm for deriving these critical curves is described further below. This modification is hereinafter referred to as Non-Parametric Sequential Allocation, or NPSA for short.

Definition 1 (Mean shortage function). For a nonnegative random variable X with pdf f and finite mean $\mu$, the mean shortage function may be expressed as $\phi(y) := \int_y^\infty (x-y)f(x)dx$ for $y \geq 0$.

Theorem 1 (critical curves). The (unique) optimal critical curves $y_n(t) \leq \ldots \leq y_1(t)$ for solving the conventional sequential allocation model problem satisfy the following system of ordinary differential equations (ODEs) (where $1 \leq k \leq n$):

$$\frac{dy_{k+1}(t)}{dt} = -\lambda(t)(\varphi(y_{k+1}(t)) - \varphi(y_k(t))),$$

$$\varphi(y_0(t)) = 0, \; y_k(T) = 0, \; t \in [0, T].$$

Solving this system of ODEs exactly is generally intractable. Theorem 1 provides the optimal solution to the conventional sequential allocation model problem.

Numerical algorithm for NPSA: In an exemplary embodiment, an algorithm to solve the non-parametric problem, may be expressed as shown below in Algorithm 1: use the M independent realizations of the job arrival process to approximate the intensity $\lambda(t)$ and the mean shortage function $\varphi(y)$, then use a numerical ODE solver with Theorem 1 to extract critical curves.

---

Algorithm 1: NPSA

Input: Number of workers n, ODE solver D
Data: M realizations of job arrival process, M
Output: Critical curves $\{\bar{y}_k(t)\}_{k=1}^n$
begin

| Estimate $\lambda_e(t)$ and $\varphi_e(y)$ from M

| $y_{0e}(t) \leftarrow \infty$ , $Y \leftarrow \{y_{0e}(t)\}$

| for k in (1,...,n) do

| | Solve via $D: y_{ke}(T)=0$ , $t \in [0,T]$.

| | $\dfrac{dy_{ke}(t)}{dt} = -\lambda_e(t) \; \varphi_e(y_{ke}(t)) - \varphi_e(y_{k-1e}(t))$ ,

| |_ $Y \leftarrow Y \cup \{y_{ke}(t)\}$

|_ return $Y \setminus y_{0e}(t)$

---

Algorithm 1 is a meta-algorithm in the sense that the estimators $\lambda_e(t)$ and $\varphi_e$ must be defined for a full specification. These estimators must be accurate so as to give the correct solution and efficient to evaluate, as the numerical ODE solver will call these functions many times.

Estimation of Non-Homogeneous Poisson Processes: The following is a discussion of estimation of the non-homogeneous Poisson process P with rate function $\lambda(t)>0$ for all $t \in [0,T]$. An assumption that we have M independent identically distributed (i.i.d.) observed realizations of this process is made. In an exemplary embodiment, the rate function estimator is taken to be piecewise constant, with breakpoints spaced equally according to some fixed width $\delta$.

Denote by $\lambda_e^{(M)}(t)$ the estimator of $\lambda(t)$ by M independent realizations of P. Let the subinterval width used by the estimator be $\delta_M>0$. $C_i(a,b)$ denotes the number of jobs arriving in the interval [a,b) in the $i^{th}$ independent realization of P. For $t \geq 0$, let '(t):=$bt/\delta_M c \cdot \delta_M$ so that $t \in$ ['(t), '(t)+$\delta_M$]. The estimator is the number of arrivals recorded within a given subinterval, averaged over independent realizations of P and normalized by the bin width $\delta_M$, that is, $$\tilde{\lambda}^{(M)}(t) = \frac{1}{M\delta_M} \sum_{i=1}^M C_i[\ell(t), \ell(t) + \delta_M]. \quad \text{Equation (1)}$$

Theorem 2 (Arrival rate estimator convergence): Suppose that $\delta_M = O(M^{-a})$ for any $a \in (0,1)$ and fix $t \in [0,T)$. Then, $\lambda_e^{(M)}(t) \to \lambda(t)$ almost surely as $M \to \infty$.

For the NPSA algorithm, Equation (1) is used with $\delta_M = T \cdot M^{-1/8}$ as the estimator for the intensity $\lambda(t)$. The time complexity of evaluating $\lambda_e(t)$ is $O(\log(1/\delta_M))$ and the space complexity is $O(1/\delta_M)$, owing to searching for the correct subinterval and storing the binned values respectively.

Mean shortage function estimator: The following result leads us to the $\varphi_e$ estimator for NPSA.

Lemma 1. The mean shortage function of Definition 1 can be written as $\phi(y) = \int_y^\infty (1-F(x))dx$, where F is the cumulative distribution function (cdf) of the random variable X.

Lemma 1 suggests the following estimator: perform the integral in Lemma 1, replacing the cdf F with the empirical cdf for the job value r.v. X computed with the samples $$(X_1, \ldots, X_N), F_N(x) := \frac{1}{N}\sum_{i=1}^{n} 1_{X_i \le x},$$

where $1_\omega$ is the indicator variable for an event $\omega$. Since the empirical cdf is piecewise constant, the integral is given by the sum of areas of rectangles. An efficient scheme is described below with respect to Algorithm 2 to compute $\varphi_e(y)$ in this manner. In particular, after initial onetime preprocessing, this estimate has a runtime complexity of O(log N) per function call, arising from the bisection search, and space complexity O(N), where N is the number of data samples used for estimation.

In an exemplary embodiment, it has been shown above that the NPSA mean-shortage function estimator is computationally efficient. It now remains to show that it is accurate, that is, statistically consistent.

Theorem 3: Let X be a nonnegative random variable with associated mean shortage function $\varphi$. Then, the estimate of the mean shortage function returned by Algorithm 2 converges in probability to the true value, that is, $$\lim_{N \to \infty} \mathbb{P}\left[\sup_{y \ge 0} |\tilde\varphi_N(y) - \varphi(y)| > \epsilon\right] = 0$$

for any $\epsilon > 0$, where the estimate computed by Algorithm 2 using N independent samples of X is denoted by $\varphi_{eN}(y)$.

---

Algorithm 2: Compute $\varphi(y)$ via empirical
complementary cumulative distribution fit (ECCDF):

Input: $y \in [0,\infty)$
Data: ECCDF fit data $0 < x_1 < \ldots < x_N$
Output: $\varphi_{eN}(y) \approx \varphi(y)$
    build cache $(x_1,\ldots,x_N)$      // run once
|    $\varphi_N \leftarrow 0$
|    for i in (N – 1,..., 1) do
|_ |_   $\varphi_i \leftarrow \varphi_{i+1} + (x_{i+1} - x_i) \cdot \frac{N-i}{N}$ begin             // at eval time
|    if $y \ge x_N$ then return 0
|    else if $y < x_1$ then return $(x_1 - y)\varphi_1$
|    else
|   |    Find $\iota$ such that $x_\iota \le y \le x_{\iota+1}$ via bisection search
|   |    $\varphi \leftarrow \varphi_{\iota+1}$
|_ |_   return $\varphi + (x_{\iota+1} - y)\varphi_\iota$

---

Proof Sketch: It can be shown that an upper bound on $|\varphi_{eN}(y) - \varphi(y)|$ is induced by an upper bound on $|F_N(x) - F(x)|$.

NPSA performance bounds: It has been shown above that the individual components of the NPSA algorithm, namely the intensity $\lambda_e(t)$ and mean shortage $\varphi_e(y)$ estimators, are computationally efficient and statistically consistent. However, in an exemplary embodiment, an important objective is in the output of the overall NPSA algorithm, that is, will following the derived threshold curves at test time yield an expected reward that is optimal with high probability? The answer to this question is affirmative under the assumptions of the problem setup as described above.

Results on approximation of ODEs are required. Consider the system of ordinary differential equations as expressed in Equation (2);

$$dx/dt = f(t,x) \qquad \text{Equation (2)}$$

where x and $f$ are d-dimensional vectors and $0 \le t < \infty$. Assume that $f(t,x)$ is continuous for $0 \le t < \infty$, $\|x\| < \infty$ and $\|\cdot\|$ is a norm. Recall that a continuous function $x(t)$ is a negative approximation to Equation (2) for some $\epsilon \ge 0$ on an interval if it is differentiable on an interval I apart for a finite set of points S, and $\|\frac{dx(t)}{dt} - f(t,x(t))\| \le \epsilon$ on I\S. The function $f(t,x)$ satisfies a Lipschitz condition with constant $L_f$ on a region $D \subset \mathbb{R} \times \mathbb{R}^d$ if $\|f(t,x) - f(t,x^0)\| \le L_f \|x - x^0\|$ whenever $(t,x),(t,x^0) \in D$.

Lemma 2. Suppose that $x(t)$ is a solution to the initial value problem of Equation (2) and $x^0(t)$ is a negative approximate solution to Equation (2). Then $$\|x(t) - x'(t)\| \le \left\|x(0) - x'(0)\right\| e^{L_f t} + \frac{\epsilon}{L_f}(e^{L_f t} - 1),$$

where $L_f$ is the Lipschitz-constant of $f(t,x)$.

Now consider two scenarios: one in which the job values are nonnegative random variables X with mean $\mu$, cdf F and mean shortage function $\varphi$; in the other, the job values are nonnegative random variables $X^0$ with mean $\mu^0$, cdf $F^0$ and mean shortage function $\varphi^0$. It is stipulated that X and $X^0$ have the same support and admit the bounded densities $f$ and $f^0$ respectively. In the first scenario, the jobs arrive with intensity function $\lambda(t) > 0$ and in the second scenario, they arrive with intensity $\lambda^0(t) > 0$. In both scenarios there are n workers. These results may be used to show that the difference between threshold curves $\|y_k(t) - y_k^0(t)\|$ computed between these two scenarios via NPSA can be bounded by a function of the scenario parameters.

It is further stipulated that the scenarios do not differ by too great a degree, that is, $(1-\delta_\lambda)\lambda(t) \le \lambda^0(t) \le (1+\delta_\lambda)\lambda(t)$ for all $t \in [0,T]$ and $(1-\delta_\varphi)\varphi(y) \le \varphi^0(y) \le (1+\delta_\varphi)\varphi(y)$ for all $y \in [0,\infty)$, where $0 < \delta_\lambda, \delta_\varphi < 1$. Moreover, define $\lambda_{max} = \max_{t \in [0,T]} \{\lambda(t)\}$. This leads to the following result.

Lemma 3. For any $k \in \{1, \ldots, n\}$, $\tilde{y}_k^f(t)$ is an approximator for $y_k(t)$ when $\epsilon > 2\mu\lambda_{max}(\delta_\varphi + \delta_\lambda)$.

Proof Sketch: Upper bound the left-hand-side of $$\|\lambda'(t)(\varphi'(\tilde{y}_{k+1}^f) - \varphi'(\tilde{y}_k^f)) - \lambda(t)(\varphi(\tilde{y}_{k+1}^f) - \varphi(\tilde{y}_k^f))\| \le \epsilon,$$

where the ODE description of $y_k$ and $y_k^0$ is employed from Theorem 1 and use the definition of an $\epsilon$-approximator.

A general bound on the difference between threshold curves derived from slightly differing scenarios may now be computed.

Lemma 4. For any $k \in \{1, \ldots, n\}$, $$|\mathcal{Y}_k(t) - \tilde{y}_k^f(t)| \le (\delta_\lambda + \delta_\varphi)\mu(e^{2\lambda_{max}(T-t)} - 1).$$

Proof Sketch. Compute the Lipschitz constant $2\lambda_{max}$ for the ODE system of Theorem 1, then use Lemmas 2 and 3.

Having bounded the difference between threshold curves in two differing scenarios, it remains to translate this difference into a difference in reward. Define $$H(\mathcal{Y}) := \int_y^\infty x f(x) dx; F(y) := 1 - F(y), \qquad \text{Equation (3)}$$

so that $\varphi(y) = H(y) - yF(y)$ by Lemma 1. In addition, for a set of not necessarily optimal threshold curves $\{\tilde{y}_k(t)\}_{k=1}^n$, the expected reward to be gained by replaying the thresholds from a time $t \in [0,T]$ is given by $$E_k(t; \widetilde{y}_k, \ldots, \widetilde{y}_1) = \int_t^T [H(\widetilde{y}_k(\tau)) + \overline{F}(\widetilde{y}_k(\tau)) \cdot E_{k-1}(\tau; \widetilde{y}_{k-1}, \ldots, \widetilde{y}_1)]$$

$$\times [\lambda(\tau) \exp[-\int_t^\tau \lambda(\sigma) \overline{F}(\widetilde{y}_k(\sigma)) d\sigma]]_{d\tau}. \quad \text{Equation (4)}$$

It is also known that $$E_n(t; \widetilde{y}_n, \ldots, \widetilde{y}_1) = \Sigma_{k=1}^n \widetilde{y}_k(t) \quad \text{Equation (5)}$$

It is desired to lower-bound the expected total reward at test time using the thresholds $\{y_k^0\}_{k=1}^n$, when the job arrival process has value distribution F and intensity $\lambda(t)$.

First, it is assumed that the functions H and F do not differ too greatly between the critical curves derived for the two scenarios. Concretely, there exist $\epsilon_{\overline{F}}, \delta_{\overline{F}}, \delta_H \in (0, 1)$ such that $e^{\delta_H} H(y_k(t)) \geq H(y'_k(t)) \geq e^{-\delta_H} H(y_k(t))$, $e^{\delta_{\overline{F}}} \overline{F}(y_k(t)) \geq \overline{F}(y'_k(t)) \geq$ $e^{-\delta_{\overline{F}}} \overline{F}(y_k(t))$ and $|\overline{F}(y'_k(t)) - \overline{F}(y_k(t))| \leq \epsilon_{\overline{F}}$ for all $k \in \{1, \ldots, n\}$ and $t \in [0, T]$
for all $k \in \{1, \ldots, n\}$ and $t \in [0,T]$. Furthermore, the mean arrival rate is defined as follows:

$$\overline{\lambda} := \frac{1}{T} \int_0^T \lambda(t) dt.$$

The following lower bound on the total reward under incorrectly specified critical curves may then be expressed as follows:

Lemma 5. Let $\delta = \max\{\delta_H, \delta_F\}$. Then $$E_n\left(t; y'_k, \ldots, y'_1\right) \geq e^{-n(\delta + \overline{\lambda}\epsilon_{\overline{F}} T)} E_n(t; y_n, \ldots, y_1).$$

Proof Sketch. Use induction on n and Equation (4).

The main result is provable based on the above. There is a technical difficulty to be overcome, whereby there is a need to push additive errors from Lemma 4 through to the multiplicative errors required by Lemma 5. This is possible when the functions H, F and $\varphi$ are all Lipschitz continuous and have positive lower-bound on $\cup_{k=1}^n$ Range$(y_k(t))$ $\cup$Range$(y_k^0(t))$.

As a shorthand, the expected reward gained by using the optimal critical curves may be denoted by $r^* := E_n(0; y_n, \ldots, y_1)$. Moreover, let the critical curves computed by NPSA from M job arrival process realizations be $\{\widetilde{y}_k^{(M)}\}_{k=1}^n$ and the associated expected reward under the true data distribution be the random variable $R^{(M)} := E_n(0; \widetilde{y}_n^{(M)}, \ldots, \widetilde{y}_1^{(M)})$.

Theorem 4. Fix an arbitrary $\varepsilon \in (0, 1)$. Then, $$\lim_{M \to \infty} \mathbb{P}\left[\frac{R^{(M)}}{r^*} \geq 1 - \epsilon\right] = 1.$$

Proof Sketch. Using Lemma 5, one can lower bound the probability by $$1 - \mathbb{P}\left[\delta_H > \frac{2\epsilon}{n}\right] - \mathbb{P}\left[\delta_{\overline{F}} > \frac{2\epsilon}{n}\right] - \mathbb{P}\left[\epsilon_{\overline{F}} > \frac{2\epsilon}{n\overline{\lambda}T}\right]. \quad (6)$$

Lemma 4 and Theorem 3 can be used to show that the third term of Equation (6) vanishes as M→∞. The first and second term also vanish by pushing through the additive error from Theorem 3 and Lemma 4 into multiplicative errors, then verifying these quantities are small enough when M is sufficiently large.

In an exemplary embodiment, Theorem 4 demonstrates that the NPSA algorithm solves the non-parametric problem optimally when the number of realizations of the job arrival process, M, is sufficiently large.

Accordingly, with this technology, an optimized process for automating a performance of non-parametric stochastic sequential assignment of jobs with random arrival times by applying an efficient job allocation algorithm is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for performing non-parametric stochastic sequential assignment of jobs with random arrival times, the method being implemented by at least one processor, the method comprising:
   receiving, by the at least one processor, a first plurality of jobs in a sequence;
   storing, in a memory, the first plurality of jobs received in the sequence;
   sequentially applying, by the at least one processor and prior to processing any of the first plurality of jobs, a non-parametric sequential allocation algorithm to each respective job from among the first plurality of jobs in order to determine whether to accept the respective job or to decline the respective job; and
   removing, from the memory and prior to the processing any of the first plurality of jobs, at least one of the first plurality of jobs that has been declined,
   wherein the sequentially applying of the non-parametric sequential allocation algorithm comprises:
   generating a predetermined number of time-varying threshold curves, the predetermined number being equal to a maximum number of jobs to be accepted within a predetermined time interval;
   calculating, for each respective jobs, a corresponding reward value that relates to a reward that is gained when the respective job is accepted;
   comparing, for each respective job from among a first subset of the first plurality of jobs, the corresponding reward value with a first threshold curve;
   determining whether to accept the respective job based on whether the corresponding reward value exceeds the first threshold curve;
   when the respective job is accepted, comparing, for each respective job from among a next subset of the first plurality of jobs, the corresponding reward value with a next threshold curve, and repeating the determining and the comparing until the predetermined number of jobs have been accepted; and
   when the predetermined number of jobs have been accepted, ending the applying of the non-parametric sequential allocation algorithm, and
   wherein the method optimizes an automation of the performing of the non-parametric stochastic sequential assignment of jobs with random arrival times.

2. The method of claim 1, wherein for each respective job from among the first plurality of jobs, a determination whether to accept the respective job or to decline the respective job is made before an arrival of a next job from among the first plurality of jobs.

3. The method of claim 1, wherein the non-parametric sequential allocation algorithm is designed to maximize an expected cumulative reward value that relates to the calculated reward values.

4. The method of claim 1, wherein the receiving of the plurality of jobs in the sequence comprises receiving the plurality of jobs based on a sequential arrival that corresponds to a nonhomogeneous Poisson process with an unknown continuous intensity function, and wherein the unknown continuous intensity function is estimated based on a first set of historical job data that includes, for each respective job from among a second plurality of jobs that have previously been received, a corresponding arrival time and a corresponding reward value.

5. The method of claim 4, wherein the generating of the predetermined number of time-varying threshold curves comprises using an unknown cumulative distribution of independent identically distributed nonnegative random variables that has an unknown finite mean value and an unknown density function to generate each respective threshold curve, and wherein each of the unknown cumulative distribution, the unknown finite mean value, and the unknown density function is estimated based on the first set of historical job data.

6. The method of claim 5, wherein the generating of the predetermined number of time-varying threshold curves further comprises estimating a mean shortage function that relates to the corresponding reward to be calculated for each respective job.

7. The method of claim 6, wherein the estimating of the mean shortage function comprises applying an empirical complementary cumulative distribution fit function to corresponding reward values that relate to the first set of historical job data.

8. A computing apparatus for performing non-parametric stochastic sequential assignment of jobs with random arrival times, the computing apparatus comprising:
a processor;
a memory; and
a communication interface coupled to each of the processor and the memory,
wherein the processor is configured to:
receive, via the communication interface, a first plurality of jobs in a sequence;
store, in the memory, the first plurality of jobs received in the sequence;
sequentially apply, prior to processing any of the first plurality of jobs, to each respective job from among the first plurality of jobs, a non-parametric sequential allocation algorithm in order to determine whether to accept the respective job or to decline the respective job; and
remove, from the memory and prior to the processing any of the first plurality of jobs, at least one of the first plurality of jobs that has been declined,
wherein the processor is further configured to:
generate a predetermined number of time-varying threshold curves, the predetermined number being equal to a maximum number of jobs to be accepted within a predetermined time interval;
calculate, for each respective jobs, a corresponding reward value that relates to a reward that is gained when the respective job is accepted;
compare, for each respective job from among a first subset of the first plurality of jobs, the corresponding reward value with a first threshold curve;
determine whether to accept the respective job based on whether the corresponding reward value exceeds the first threshold curve;
when the respective job is accepted, compare, for each respective job from among a next subset of the first plurality of jobs, the corresponding reward value with a next threshold curve, and repeat the determining and the comparing until the predetermined number of jobs have been accepted; and
when the predetermined number of jobs have been accepted, end the applying of the non-parametric sequential allocation algorithm, and wherein the processor is further configured to optimize an automation of the performance of the non-parametric stochastic sequential assignment of jobs with random arrival times.

9. The computing apparatus of claim 8, wherein for each respective job from among the first plurality of jobs, the processor is further configured to determine whether to accept the respective job or to decline the respective job before an arrival of a next job from among the first plurality of jobs.

10. The computing apparatus of claim 8, wherein the non-parametric sequential allocation algorithm is designed to maximize an expected cumulative reward value that relates to the calculated reward values.

11. The computing apparatus of claim 8, wherein the processor is further configured to receive the plurality of jobs in the sequence based on a sequential arrival that corresponds to a nonhomogeneous Poisson process with an unknown continuous intensity function, and wherein the unknown continuous intensity function is estimated based on a first set of historical job data that includes, for each respective job from among a second plurality of jobs that have previously been received, a corresponding arrival time and a corresponding reward value.

12. The computing apparatus of claim 11, wherein the processor is further configured to generate the predetermined number of time-varying threshold curves by using an unknown cumulative distribution of independent identically distributed nonnegative random variables that has an unknown finite mean value and an unknown density function to generate each respective threshold curve, and wherein each of the unknown cumulative distribution, the unknown finite mean value, and the unknown density function is estimated based on the first set of historical job data.

13. The computing apparatus of claim 12, wherein the processor is further configured to generate the predetermined number of time-varying threshold curves by estimating a mean shortage function that relates to the corresponding reward to be calculated for each respective job.

14. The computing apparatus of claim 13, wherein the processor is further configured to estimate the mean shortage function by applying an empirical complementary cumulative distribution fit function to corresponding reward values that relate to the first set of historical job data.

15. A non-transitory computer readable storage medium storing instructions for performing non-parametric stochastic sequential assignment of jobs with random arrival times, the storage medium comprising executable code which, when executed by a processor, causes the processor to:
receive a first plurality of jobs in a sequence;
store, in a memory, the first plurality of jobs received in the sequence;
sequentially apply, prior to processing any of the first plurality of jobs, to each respective job from among the first plurality of jobs, a non-parametric sequential allocation algorithm in order to determine whether to accept the respective job or to decline the respective job;
remove, from the memory and prior to the processing any of the first plurality of jobs, at least one of the first plurality of jobs that has been declined,
wherein the executable code further causes the processor to:
generate a predetermined number of time-varying threshold curves, the predetermined number being equal to a maximum number of jobs to be accepted within a predetermined time interval;

calculate, for each respective job, a corresponding reward value that relates to a reward that is gained when the respective job is accepted;

compare, for each respective job from among a first subset of the first plurality of jobs, the corresponding reward value with a first threshold curve;

determine whether to accept the respective job based on whether the corresponding reward value exceeds the first threshold curve;

when the respective job is accepted, compare, for each respective job from among a next subset of the first plurality of jobs, the corresponding reward value with a next threshold curve, and repeat the determining and the comparing until the predetermined number of jobs have been accepted; and when the predetermined number of jobs have been accepted, end the applying of the non-parametric sequential allocation algorithm, and wherein the executable code further causes the processor to optimize an automation of the performance of the non-parametric stochastic sequential assignment of jobs with random arrival times.

16. The storage medium of claim 15, wherein for each respective job from among the first plurality of jobs, a determination whether to accept the respective job or to decline the respective job is made before an arrival of a next job from among the first plurality of jobs.

17. The storage medium of claim 15, wherein the non-parametric sequential allocation algorithm is designed to maximize an expected cumulative reward value that relates to the calculated reward values.

* * * * *